May 4, 1965   M. SCHAIBLE ETAL   3,181,207
AUTOMATIC MOLD PREPARING APPARATUS
Filed March 15, 1962   11 Sheets-Sheet 1

INVENTOR.
MICHAEL SCHAIBLE AND
WAINWRIGHT TUTTLE,
BY

ATTORNEYS.

May 4, 1965 M. SCHAIBLE ETAL 3,181,207
AUTOMATIC MOLD PREPARING APPARATUS
Filed March 15, 1962 11 Sheets-Sheet 2
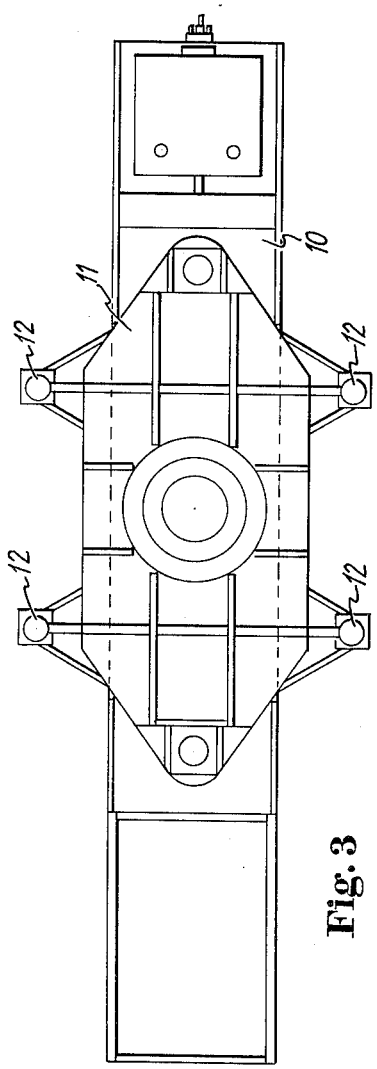
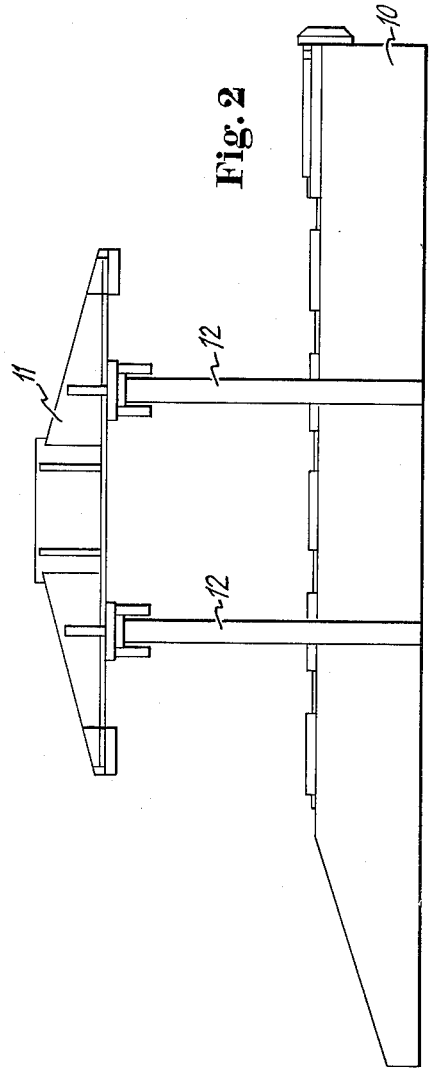
INVENTOR.
MICHAEL SCHAIBLE AND
WAINWRIGHT TUTTLE,
BY
ATTORNEYS.

STA. 1

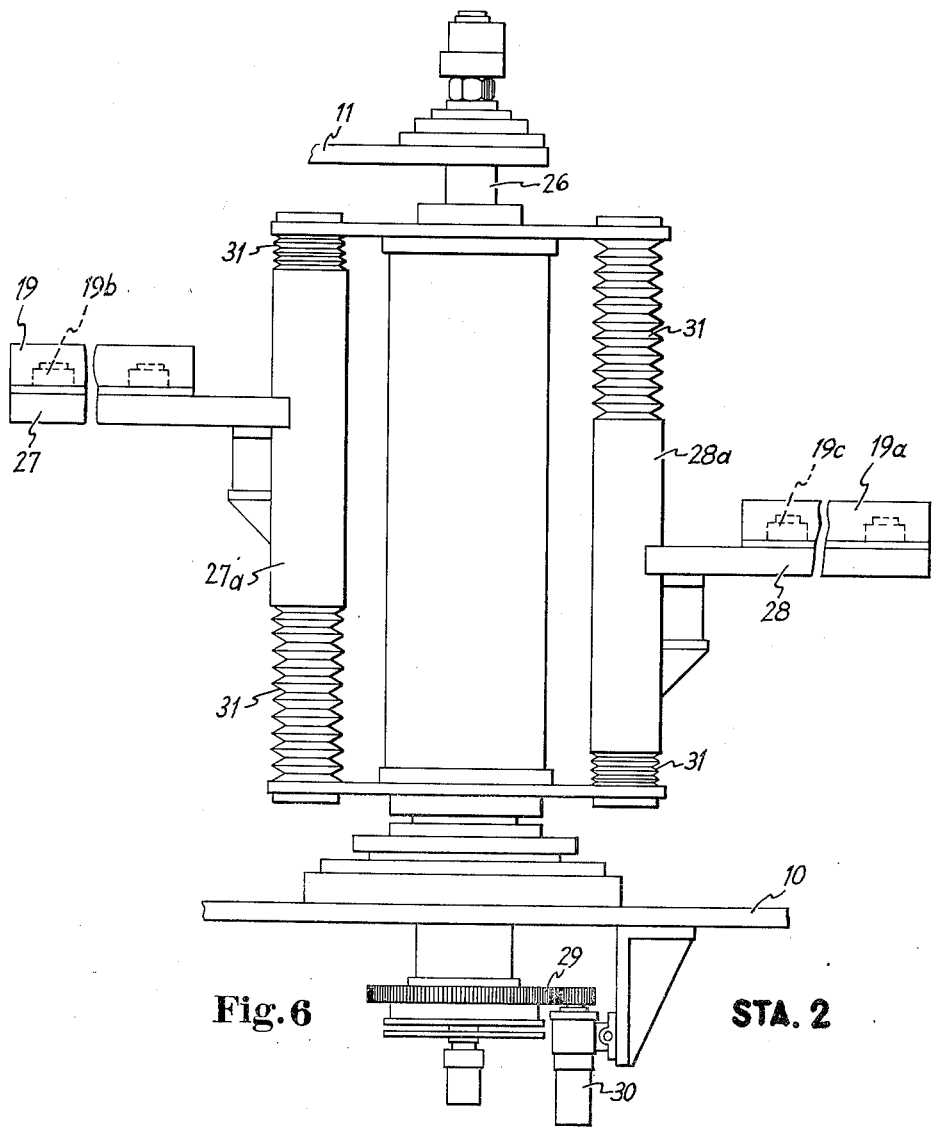

May 4, 1965   M. SCHAIBLE ETAL   3,181,207
AUTOMATIC MOLD PREPARING APPARATUS
Filed March 15, 1962   11 Sheets-Sheet 5
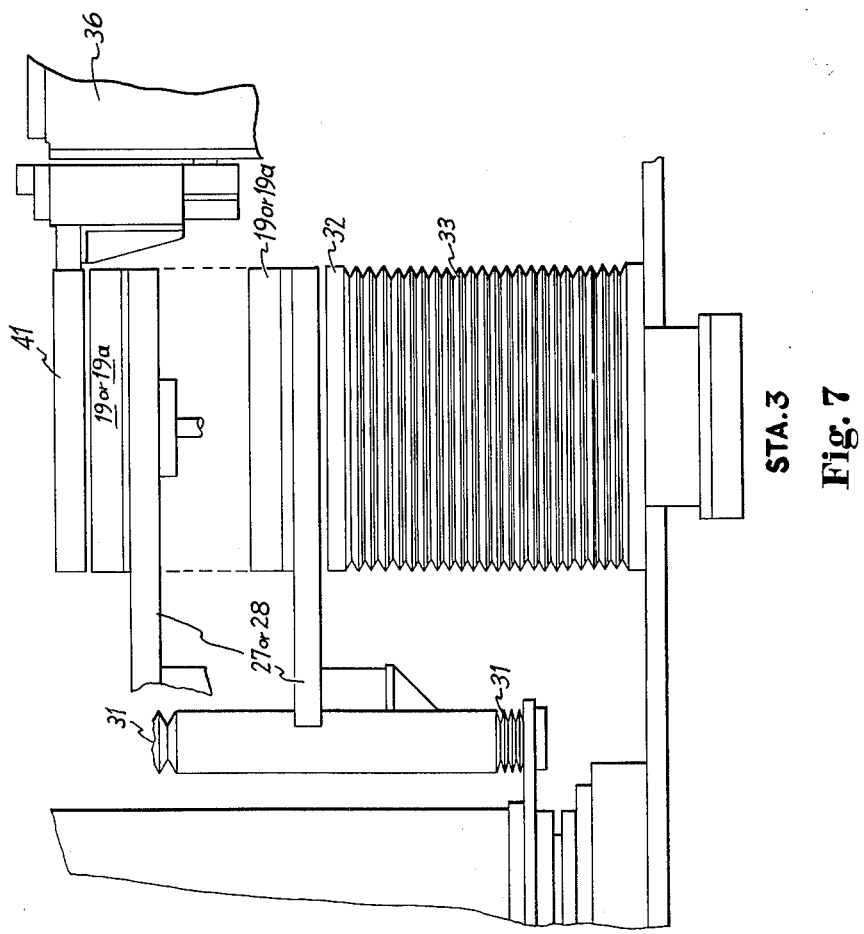
INVENTOR.
MICHAEL SCHAIBLE AND
WAINWRIGHT TUTTLE,
BY
ATTORNEYS.

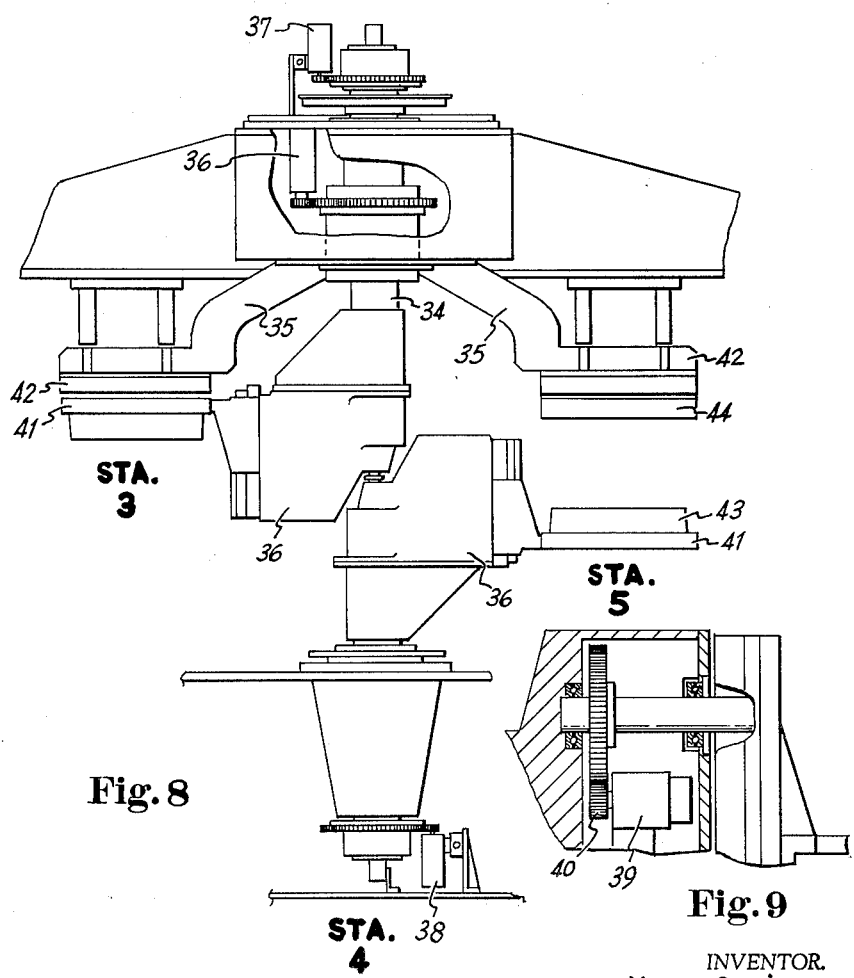

STA.5

May 4, 1965 M. SCHAIBLE ETAL 3,181,207
AUTOMATIC MOLD PREPARING APPARATUS
Filed March 15, 1962 11 Sheets-Sheet 8
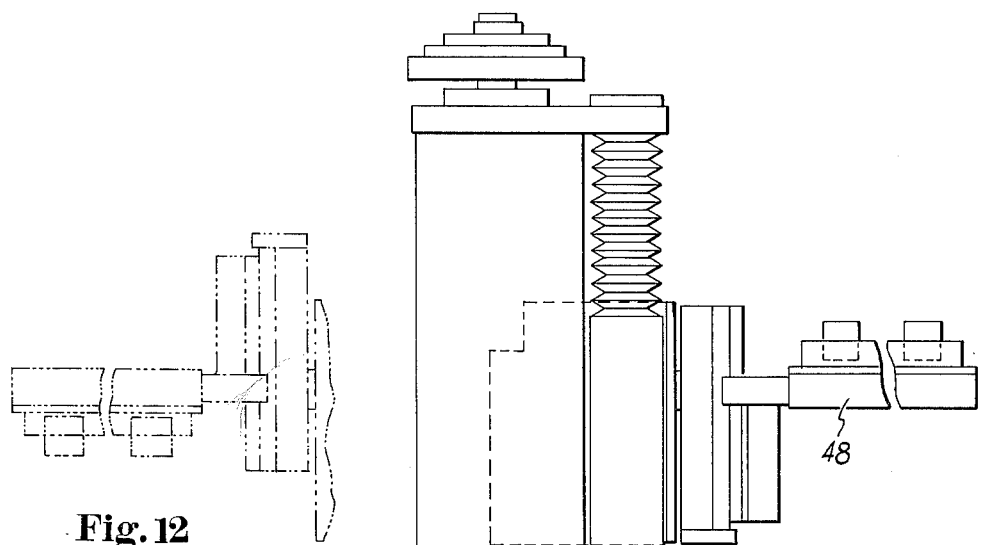
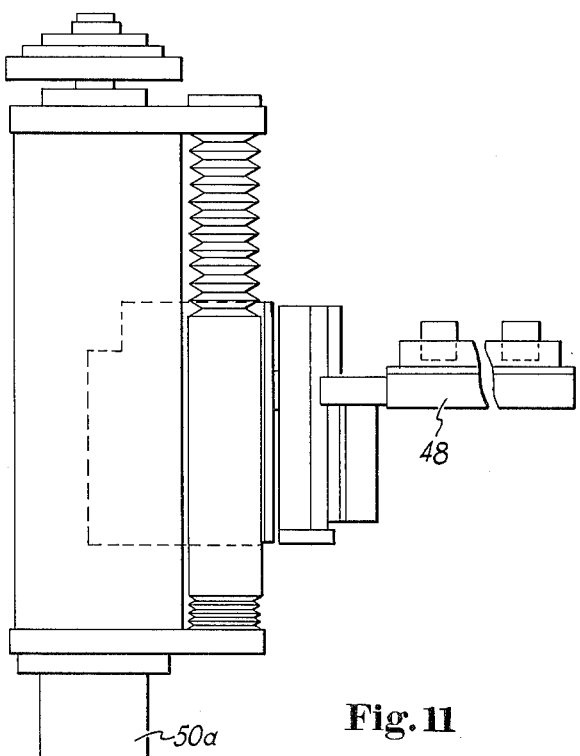
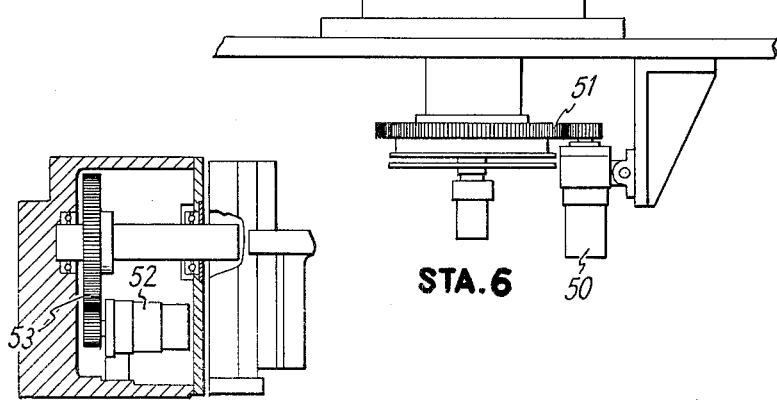
INVENTOR.
MICHAEL SCHAIBLE AND
WAINWRIGHT TUTTLE,
BY
ATTORNEYS.

STA. 7

INVENTOR.
MICHAEL SCHAIBLE AND
WAINWRIGHT TUTTLE,

May 4, 1965  M. SCHAIBLE ETAL  3,181,207
AUTOMATIC MOLD PREPARING APPARATUS
Filed March 15, 1962  11 Sheets-Sheet 10
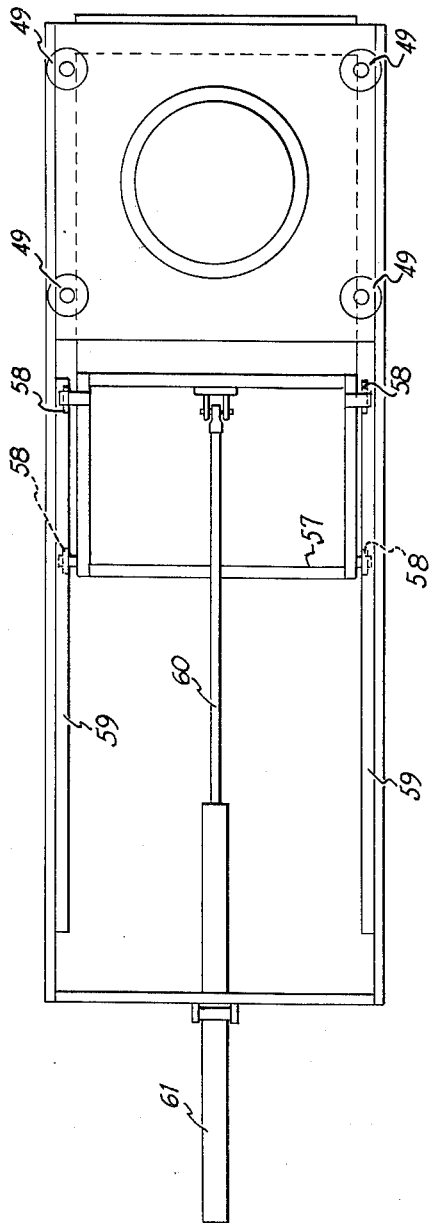
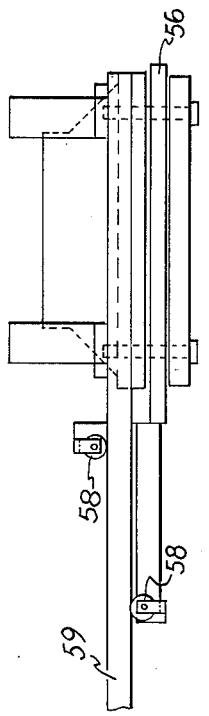
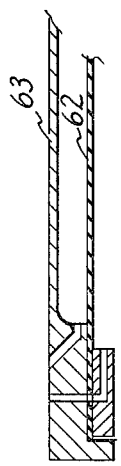
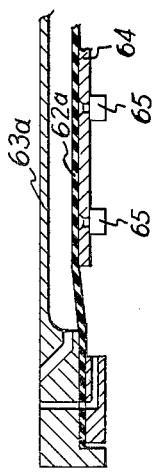
INVENTOR.
MICHAEL SCHAIBLE AND
WAINWRIGHT TUTTLE,
BY
ATTORNEYS United States Patent Office 3,181,207
Patented May 4, 1965

3,181,207
AUTOMATIC MOLD PREPARING APPARATUS
Michael Schaible and Wainwright Tuttle, Cincinnati,
Ohio, assignors, by mesne assignments, to Altamil Corporation, Indianapolis, Ind., a corporation of Delaware
Filed Mar. 15, 1962, Ser. No. 179,960
25 Claims. (Cl. 22—20)

This application is a continuation-in-part of our copending application Serial No. 116,743, filed June 13, 1961, now abandoned, and entitled "Apparatus and Method for the Use of a Vacuum in Foundry Operations."

This invention relates to an automatic mold preparing apparatus. More specifically it relates to an apparatus which is fully automatic and in which mating drag and cope molds may be prepared by what is known as sand shooting, the sand molds being hardened by carbon dioxide gas as is well known, and wherein the hardened drag and cope molds are automatically extracted from their respective mold boxes and transferred to an assembly station where they are brought into spaced, aligned, mutually facing positions for closing; and wherein, if desired, a core may also be automatically prepared and ejected from the core box top; and wherein the core is automatically transported to a position between the drag and cope molds and is automatically seated in the drag mold and ejected from the core box bottom, whereupon automatically the mold is closed and transferred to a position for casting.

While in the present application a complete apparatus will be described in which it is possible to prepare fully automatically a cored mold, the core-making portion of the apparatus may of course be eliminated if the mold does not require a core or cores.

The present apparatus is particularly useful in the preparation of multiple cavity molds with multiple cores therein, such for example as might be required for the case where a plurality of elements such as pipe elbows and the like are to be cast in a single operation. Thus, with the apparatus of the present invention it is possible to prepare mating drag and cope molds having properly spaced and aligned cavities and concurrently to prepare a number of cores equal to the number of cavities in the drag and cope molds, said cores being held in properly spaced and oriented relation so that all of the cores may be seated in their respective cavities in the drag mold in a single operation; and the mold may then be closed to provide a plurality of cored mold cavities to produce, for example, eighty pipe elbows in a single casting operation.

The apparatus is of course useful in the preparation of single molds having single cavities with or without one or more cores as well as the production of multiple cavity molds with or without multiple cores.

With the foregoing considerations in mind, it is the principal object of the present invention to provide an apparatus which will automatically provide complete molds for a casting operation at high speed with no repetitive manual operations and with minimum attention from a supervisor whereby to contribute to the economy of manufacture of castings.

In this connection, it is a further object of the invention to eliminate all handwork in the handling of molds, in the extraction of cores from core boxes, in the extraction of molds from mold boxes, in the seating of cores in the molds, in the closing or assembling of the molds and the conveying of the complete assembled molds, and to eliminate entirely the mudding and cleaning of cores.

It is another object of the invention to provide an apparatus to produce assembled molds with or without cores, which molds and cores will have an improved dimensional accuracy.

Finally, it is an object of the invention to provide an apparatus as above outlined which is durable, easily maintained, protected from accidental damage, safe and simple to operate and adaptable to many materials and products.

These and other objects of the invention which will be described in more detail hereinafter we accomplish by that certain construction and arrangement of parts of which we shall now describe certain exemplary embodiments.

Reference is made to the drawings forming a part hereof and in which:

FIGURE 2 is a more detailed elevational view of the structural framework for the apparatus of FIGURE 1.

FIGURE 3 is a plan view of the structure of FIGURE 2.

FIGURE 6 is a front elevational view of the transfer apparatus for transferring mold boxes from the shooting station to the extraction station.

FIGURE 7 is a front elevational view of the apparatus at the extraction station.

FIGURE 8 is a front elevational view of the transfer station for transferring molds from the extraction station to the assembly station.

FIGURE 9 is a fragmentary view of the roll-over apparatus of FIGURE 8.

FIGURE 11 is a detailed view of the apparatus for transferring cores from the core shooting station to the assembly station.

FIGURE 12 is a fragmentary view showing the core supporting arm in rolled-over position at the assembly station.

FIGURE 13 is a fragmentary detailed view of the roll-over portion of the apparatus of FIGURE 11.

FIGURE 15 is an enlarged scale view of the diaphragm assembly used in the core shooting station and the mechanism for moving it.

FIGURE 16 is a fragmentary elevational view of the same.

FIGURE 17 is a fragmentary cross-sectional view on an enlarged scale of one type of diaphragm device.

FIGURE 18 is a view similar to FIGURE 17 showing an alternative construction.

Briefly, in the practice of the invention we provide an apparatus having a series of operating stations which for convenience may be numbered from 1 to 7. Station No. 1 is the mold shooting station at which sand is shot into a mold box to provide a mold half. At station No. 2 there is provided a transfer mechanism having two diametrically opposite arms, one of which carries a drag mold box and the other a cope mold box. These boxes contain, respectively, a drag mold pattern and a cope mold pattern. The transfer apparatus alternately delivers an empty drag mold box with pattern and an empty cope mold box with pattern to the shooting station and a filled cope mold box and drag mold box to station No. 3 which is the extraction station. Beyond the extraction station is station No. 4 which is again a transfer station provided with a pair of drag mold arms and a pair of cope mold arms. When a filled cope mold box is presented to the extraction station, one of the cope mold arms from station No. 4 is positioned to assist in the extraction operation and to support the extracted cope mold for transfer to station No. 5 which is the assembly station. Similarly, a drag mold arm will arrive at the extraction station when a filled drag mold is presented thereto by the transfer mechanism at station No. 2. The cope mold carrying member at station No. 4 simply transfers the completed cope mold to the assembly station, but the drag mold carrying member at station No. 4 in transferring a completed drag mold to the assembly station is arranged to invert the drag mold so that at the assembly station the cope and drag molds arrive in properly mutually facing position and in proper alignment and spaced apart.

In the meantime, a core box is being shot with sand at the core shooting station, which is station No. 7; and, after shooting, the cores are automatically ejected from the core box top at said shooting station and thereafter the core box bottom with the completed cores in place, is transferred from the core shooting station No. 7 to the assembly station No. 5 and is inverted during the transfer.

All of the foregoing operations occur in timed sequence so that at a given point there will be at the assembly station a drag mold with its cavities facing up, the core box bottom in inverted position and above that a completed cope mold in inverted position with its cavities facing downward. At this station, the core box bottom and drag mold are brought together to seat the cores in the drag mold and immediately to extract the cores from the core box bottom which is then automatically returned to the core shooting station. Immediately thereafter, the assembled drag mold and cores are brought together with the completed cope mold to close the mold, whereupon the completed mold, still supported on its drag carrying member of station No. 4, is transferred to a discharge point for casting.

Figure 1:
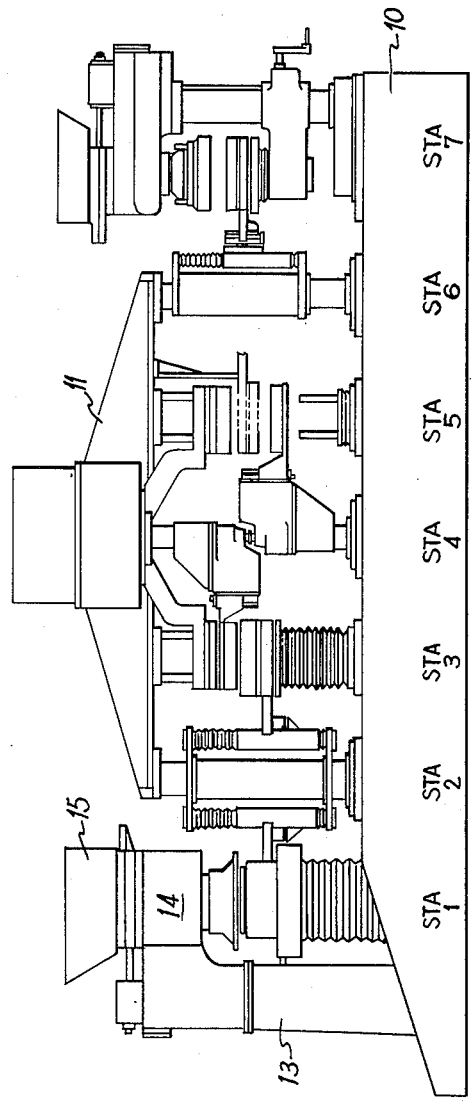
FIGURE 1 is an elevational view of the complete apparatus according to the present invention.

Referring now more particularly to the drawings and with particular reference to FIGURE 1, the seven stations have been numbered across the base of the apparatus. The apparatus will be mounted upon a suitable base structure indicated generally at 10 and will be provided with a superstructure 11 in the form of a rigid beam for the purpose of providing for rigidity of the structure as a whole and to insure that the molds may be properly squared. The superstructure 11 may be supported by means of columns 12 (FIG. 2), which columns may be secured to the base 10 or may be separately set in concrete as desired. It is only necessary that the superstructure 11 be rigidly mounted with respect to the base and strictly parallel to the base 10. The details of this construction do not form a part of the invention and may be varied to suit conditions.

Mounted on a suitable support 13 is the mold shooting machine indicated generally at 14. The shooting machine will not be described in detail because in itself it does not form a part of the present invention. Such machines are available on the open market and are manufactured, for example, by Hansberg Shooters, Inc. These machines are provided with a hopper 15 and generally conveying means are provided to supply sand to the hopper to be shot into the molds.

The particular sand mixture does not form a part of the invention but in practice we have found a suitable mixture to be made up as follows:

100 lbs. Shinrock No. 3 Sand
200 lbs. washed silica sand 83AFS
3 lbs. Sandflo (flyash)
13½ lbs. Moroc (sodium silicate with additives)
3 pints kerosene
Water—about 1½ pints increased or decreased to correct for dry sand moisture variation from the normal 0.4%.

The above sand mixture will have a green compression factor of 1.5, a moisture content of 3.2%, a dry shear of 38.5 pounds per square inch and a scratch hardness of 55. In a typical apparatus, a fifty pound load of sand fills the sand cylinder for mold shooting and the greater part of this sand is shot into the mold box against the pattern by means of air supplied from an accumulator at 80 p.s.i. After the mold has been filled and compacted as will be described hereinafter, the sand mold is hardened by treatment with carbon dioxide gas at room temperature or heated for faster hardening, plain or mixed with air for better distribution.

Figure 5:
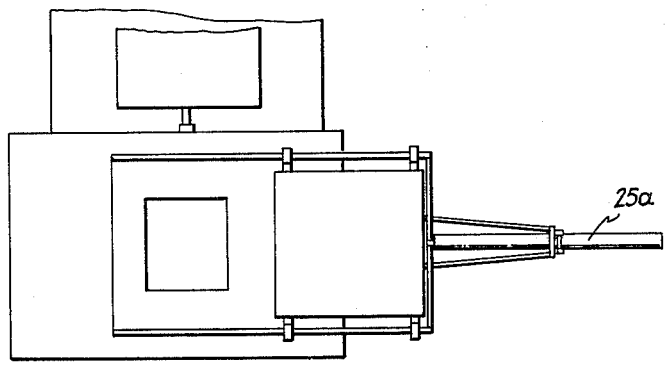
FIGURE 5 is a cross-sectional view of the blow-head on the line 5—5 of FIGURE 6, showing the squeeze plate of FIGURE 4.
Figure 4:
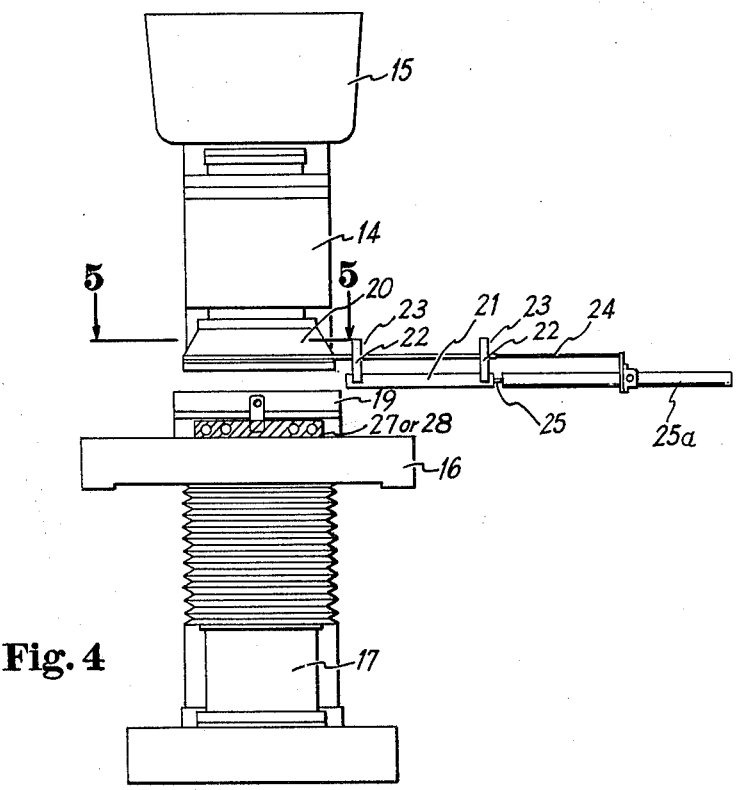
FIGURE 4 is an elevational view of the mold shooting station as seen from the right of FIGURE 1.

With particular reference to FIGURES 4 and 5, there is provided at the shooting station a table 16 initially positioned by an hydraulic cylinder (not shown) and operated by a piston in an air cylinder 17, whereby the table 16 may be raised or lowered. In its lowered position the table 16 accommodates a mold supporting member 27 or 28 operated from station No. 2 which will be described hereinafter. An empty mold box 19 rests on the supporting member 27 or 28. When air pressure is applied in the cylinder 17, the table 16 is raised carrying with it the supported member 27 or 28 and the empty mold box 19 and presses the mold box 19 against the blow-plate 20 of the shooting machine. The blow-plate has slots communicating with the blow-head and air vents communicating with the atmosphere. In the particular machine in question, the sand is shot into the mold box against the pattern therein by air at a pressure of about 80 p.s.i. It will be understood that the mold box and the pattern are provided with suitably screened or slotted vents on the underside.

When the mold has been shot with sand, the table 16 falls because the air in the cylinder 17 is vented to a suitable exhaust, and a squeeze plate 21 is inserted. The squeeze plate 21 is suitably supported as by members 22 and rollers 23 on rails 24 and is connected to a rod 25 secured to the piston of an hydraulic cylinder 25a. By means of suitable valves and electrical circuits, the piston of the hydraulic cylinder is caused to move the squeeze plate 21 into position between the top of the mold and the blow-head. The squeeze plate 21 is simply a perfectly flat imperforate plate and when it is in position, air is again applied to the cylinder 17 to raise the table under a high pressure (about 120 p.s.i.), whereby to squeeze the sand in the mold to compact it to a greater density and to flatten the back of the mold. As soon as this has been accomplished, the air pressure is vented. At the same time air pressure is applied to a cylinder which moves an eccentric on the mounting of the long hydraulic cylinder, to cause the squeeze plate to move in the out direction about ⅛" as soon as the squeeze force has fallen to the point where the friction force is overcome. This breaks the adhesion of the sand to the squeeze plate. The table then drops as previously described and the hydraulic cylinder is actuated to withdraw the squeeze plate 21. The withdrawal of the squeeze plate may be deferred until the sand cylinder is refilled, in order to prevent small amounts of sand from falling into the mold box prematurely from the impact of the sand on the residual sand in the blow slots. A somewhat simpler construction and method to break this adhesion is to provide the blow plate with a strip around the edges which bears on the mold frame when shooting the mold. The sand is then above the mold frame enough to permit squeezing it without having the squeeze plate enter the mold frame. The retracting force of the squeeze plate hydraulic cylinder is then applied before the table falls and as soon as the squeezing force has fallen to a point where the hydraulic cylinder can overcome the friction, the squeeze plate retracts, initially sliding on the sand and breaking the adhesion. This method does not, however, readily permit leaving the squeeze plate under the blow plate during the refill of the sand cylinder to prevent small amounts of sand from falling into the mold box prematurely. At this point carbon dioxide gas at room temperature is applied to the sand in the mold box in any suitable manner as desired to blow the carbon dioxide gas at a pressure of say 12 inches of water through the sand mold which is of course porous. This hardens the sand so that it resists shock and abrasion as is well known.

Referring now to FIGURE 6, which represents the transfer station No. 2, there is shown a column 26 extending between the base 10 and the superstructure 11 of the apparatus upon which a pair of mold headers 27, 28 are mounted. From FIGURE 6 it will be noted that the entire structure between the members 10 and 11 is arranged for rotation through a gear train indicated generally at 29, driven by an hydraulic motor 30 so that the arms 27 and 28 rotate therewith 180° and return. However, these arms are individually mounted on vertical rods by means of sleeves 27a, 28a for vertical sliding movement. Suitable protective flexible tubing is provided above and below the sleeves 27a and 28a as indicated at 31 to prevent entrance of foreign matter which would score or damage the mechanism. By the means just described, the arms 27 and 28 may move up or down in a vertical direction independently of each other. The vertical movement just described is necessitated to permit the table 16 of FIGURE 4 to raise the mold box to blowing position, to lower it for insertion of the squeeze plate, and to permit the table at station 3 to raise it for mold extraction.

Supported on the arm 27 is a mold box 19 and supported on the arm 28 is another mold box 19a. Each of these boxes contains one or more patterns 19b, 19c. In practice one of the mold boxes 19 or 19a will be a cope mold box and the other a drag mold box and when the apparatus is in operation when a cope mold box 19, for example, is presented at the shooting station to be shot with sand, a drag mold box 19a which has already been shot will be presented to the extraction station, to be described hereinafter, for extraction of the completed mold from its box. In other words, at the shooting station, a cope mold box and a drag mold box will be shot with sand alternately and at the extraction station a filled drag mold box and a filled cope mold box will be presented for extraction alternately.

It will be understood that the operation of the mechanism of FIGURE 6 is timed in relation to the operation of the shooting machine, which relationship will be described in more detail hereinafter.

Referring now to FIGURE 7, which represents the extraction station No. 3, there is provided a table 32 actuated by the piston of an hydraulic cylinder disposed within the protective flexible tubing 33 and the arms 27 and 28 alternately come into position over the table 32 carrying thereon a filled mold box 19 or 19a. In order to understand the operation of the extraction station, it is necessary to turn momentarily to FIGURE 8 describing the transfer station 4, by means of which extracted cope and drag molds are transferred from the extraction station to the assembly station. At station 4 there is again a column 34 upon which are mounted a pair of cope arms 35 and a pair of drag arms 36. Individual means are provided as at 36 to rotate the cope arms 35 as a unit, as at 37 to drive one of the drag arms 36 in rotation and as at 38 to drive the other drag arm individually in rotation. Each of the drag arms is provided with mechanisms shown in detail in FIGURE 9, comprising a motor 39 and a gear train 40 by means of which the respective mold carriers 41 of the two drag arms are caused to roll over in a vertical plane from the position shown at the left of FIGURE 8 to the position shown at the right of FIGURE 8 to invert the mold.

As indicated hereabove, while extraction may be accomplished in a variety of ways, we prefer to accomplish it by a combination of a vacuum against the sand surface exposed in the mold box and air pressure acting through the vents in the mold box against the side of the mold which is in the box to free the mold from its box. Because the sand in the mold, after it has hardened, is still porous, the sand mold can be held against a vacuum carrier by continuous exhaust while the mold is transported from one place to another. Thus, suitable means are provided both in the carriers 41 and in the carriers 42 to exhaust air, and corresponding means are provided in the mold headers 27 and 28 to supply air under pressure.

Returning now to FIGURE 7 and assuming that a cope mold box is in position on the member 27 or 28 and one of the cope mold arms 35 has moved the cope carrier 42 into position, the table 32 rises to bring the sand surface of the mold against the cope carrier, whereupon by a combination of vacuum through the cope carrier and air pressure through the mold header and pattern, the mold is extracted from the mold box and held to the cope carrier by which it is then moved to the assembly station upon rotation of the arms 35. A similar operation takes place with a drag mold box resting on its header 27 or 28, but in this instance one of the drag arms 36 will have brought a drag carrier 41 into position over the drag mold box. The drag mold is extracted from its box in the same way as described above in connection with the cope mold, the only difference being that as the drag arm 36 rotates to take the drag mold to the assembly station, the mechanism of FIGURE 9 operates to roll-over the drag mold so that its cavity or cavities face upward. Thus, there will be provided at the assembly station, station No. 5, a drag mold 43 which has been inverted so that its cavity or cavities face upward, and a cope mold 44 which has not been inverted and whose cavities therefore face downward.

The various machine components described above are located in relation to each other with extreme accuracy. Further, the two arms at station 2 are identical and the pair of arms at station 4 are identical, and the limits of movement of the various arms is accurately limited in all planes. When once the machine is properly set up, since the molds are held on their respective carriers in non-slip condition, the cope and drag molds will always come into proper registry at the assembly station 5 without the need for locating pins or other aligning means. The core machine and the station 6 transfer median (described hereinafter) are adjustable so that they too may be accurately set up; and once so set up, the cores will always be brought to the drag in perfect registry.

If the mold does not require a core, the drag and cope molds are then assembled. If cores are required, the cores are next inserted as will now be described.

Figure 14:
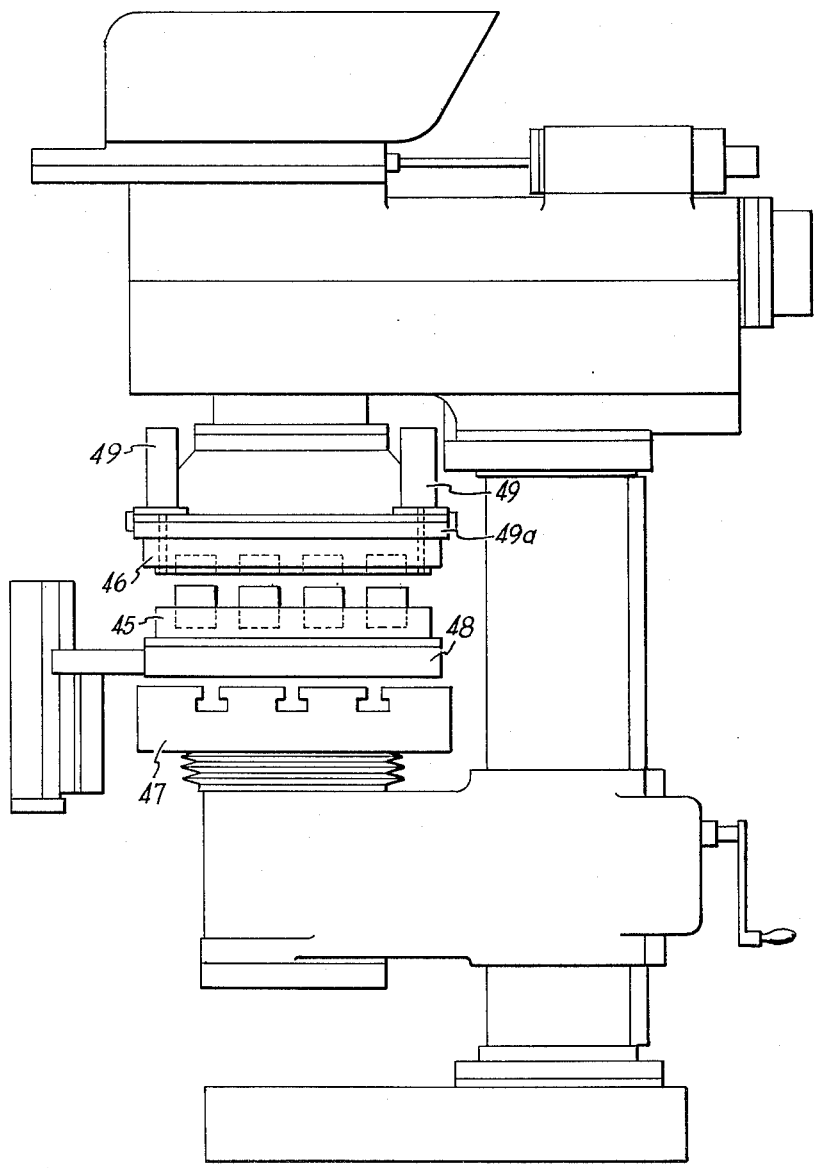
FIGURE 14 is a detailed view of the apparatus at the core shooting station.

With reference to FIGURE 14, there is provided a core shooting machine which is generally similar to the mold shooting machine of station 1. At this station, a core box comprising a bottom 45 and a top 46 with suitable core cavities are brought together and shot with sand in the same manner as the mold boxes described hereinabove. After sand has been shot into the core box cavities, the table air cylinder pressure is reduced and the four air cylinders 49 force the complete corebox header 48 and table 47 downward without any separation of top 46 and bottom 45 to the short full stroke of the four air cylinders. At this point, a diaphragm assembly shown in greater detail in FIGURES 15 to 18 inclusive, enters between the core shooter blow-plate 49a and the core box top 46. The stroke of the four air cylinders is reversed and table, header and corebox move up together under the influence of the low air pressure in the table cylinder, clamping the diaphgram assembly between the blow plate and the corebox top. Carbon dioxide gas is blown through suitable openings and vents in the core box top beneath the diaphragm and air is expelled through vents in the core box bottom which are preferably maintained at ngeative pressure to assist the flow of air and gas.

After the core has been hardened by the carbon dioxide gas treatment, air pressure is caused to enter the space above the diaphragm to urge the diaphragm to bulge down through the core blow openings, to cause the cores to be ejected from the core box top as the table 47 is caused to drop. The details of the diaphragm will be described in detail hereinafter but the result of this operation is to free the cores from the core box top and cause them to remain in the core box bottom. Air is then exhausted through the core box header 48 to provide negative pressure under the core box so that when the core box on its header is removed from station 7 and brought to station 5 for assembly, during which movement it is rolled over in the same way as the drag molds were rolled over, the core box bottom and its contained cores are supported by vacuum from the header 48.

The transfer apparatus is shown in detail in FIGURE 11 and comprises basically a column 50a having the header 48 secured thereto in a manner to permit vertical movement in the same way as described above in connection with the arms 27 and 28 at station 2 but to enforce rotation with the column. Rotation is accomplished by means of a hydraulic motor or the like at 50, operating through a gear train as at 51. Again a roll-over mechanism, shown in FIGURE 13 and strictly similar to that shown in FIGURE 9, embodying a hydraulic motor 52 operating through a gear train 53 produces an inversion of the core box during rotation from the position at the right of FIGURE 11 to the position shown in FIGURE 12.

Figure 10:
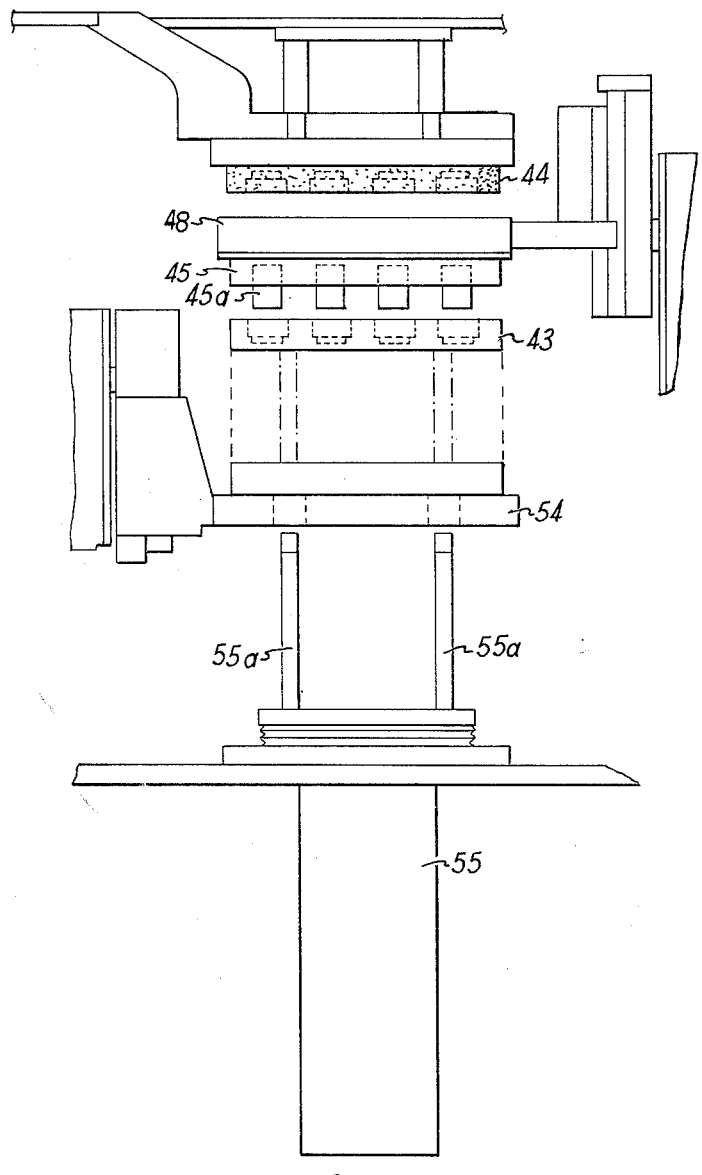
FIGURE 10 is a detailed view of the apparatus at the assembly station.

Coming back to FIGURE 10, it will be remembered that a drag mold has been brought into position as at 43 and a cope mold has been brought into position as at 44. In the meantime, as just before described, a core box bottom 45 containing one or more cores 45a has been positioned by means of the core header 48. At the assembly station 5, there is a table 54 actuated by a piston in a cylinder 55; air pressure is now admitted to the cylinder 55 to cause the lifters 55a to raise the drag mold 43 into contact with the core box bottom 45, whereby the cores 45a are seated in the cavities in the drag mold 43. At this point, air pressure is supplied through the core box header to force the cores out of the core box bottom 45 as the table 54 drops, whereby the individual cores are properly seated in the respective cavities in the drag mold 43. It should be noted that any of the constructions and methods of ejecting cores from the core box top into the core box bottom, can also be used to set the cores from the core box bottom into the drag. The core box header then returns to the core shooting station 7 and the table 54 is again caused to rise to bring the drag mold and the seated cores into contact with the cope mold 44 to close and complete the mold. At this point, the vacuum, operating through the cope carrier, is cut off so that when the table 54 is again caused to crop the completed mold drops with it. The particular drag arm, which at this point is at the assembly station, is then caused to rotate, say, 90° to a discharge station where, by means of a suitable push rod the completed mold is pushed off the carrier 54 onto a suitable conveyor to be conveyed away for casting.

While we have not shown details of the electrical circuitry nor the hydraulic or pneumatic circuitry necessary for the operation of the apparatus, this circuitry is such that one skilled in the art can supply the necessary connections based on the timing chart of FIGURE 19 which will now be described in detail. In this chart, the horizontal lines represent intervals of approximately one second each so that reading the chart from top to bottom we are measuring the passage of time. Reading transversely across the chart, we have numbered the various stations as heretofore described from 1 to 7. As indicated by the key at the bottom of the figure, the movement of a drag is indicated by a broken line. The movement of the cope is indicated by a straight line having teeth, and the movement of a core is indicated by a scalloped line. The solid curve lines are identified on the drawing itself. The entire diagram represents one complete cycle producing two complete assembled molds with cores in place.

Taking up first the movement of the drag header or arm at station No. 2 and the cope header or cope arm, it will be seen that starting at the top of the diagram these arms move to a position where the drag header is at station No. 1 and the cope header is at station No. 3. They remain for some nine seconds in this position whereupon they rotate through 180° to reverse position with the cope header now being at station No. 1 and the drag header at station No. 3. Thus, these arms simply reverse positions approximately every twelve and a half seconds. Following now the drag, it will be seen that at point 100 the drag is being shot and while the drag header remains at station 1 the table is lowered, the squeeze plate inserted, the table is raised to carry out the compacting operation, the table is lowered and carbon dioxide gas is injected. The drag is then moved with the drag header to station No. 3 where it arrives at point 101. While it remains at station 3, the station 3 table is raised, the carbon dioxide gas is shut off, the extraction operation proceeds and the table, with the drag mold box, is lowered. At point 102 it will be seen that the empty drag mold box is returned with the drag header to station No. 1, while the mold which has been extracted is conveyed by the station 4 transfer mechanism to the assembly station 5 where it arrives at the point 103. By following the diagram, it will be observed that the drag mold then remains at station 5 until the point 104 where it is conveyed with the cores and a cope mold, which in the meantime have been assembled with it, to an intermediate station for discharge.

During its movement between the points 102 and 103, the drag mold is rolled over or inverted.

It will also be noted that while the drag mold is being extracted between points 101 and 102, the cope header has moved to station 1 and at the point 105 the cope is being shot with sand. At the point 106, the cope arm with the shot cope mold moves to station 3 where it arrives at the point 107 and remains to the point 108 during which the cope mold is subjected to the same action as was the drag mold between points 101 and 102. From point 108 the cope mold is moved without being rolled over to station 5 where it arrives at the point 102 and between the points 109 and 104 it is assembled with the drag mold which arrives at station 5 at the point 103. It will be noted that at station 1, while the cope mold is being extracted between points 107 and 108, a new drag mold is being shot at point 100a and while the drag and cope molds are being assembled between points 109 and 104, another top mold is being shot at the point 105a.

In the meantime, a single core or a set of cores is being shot at station 7 between points 110 and 111 and this set of cores is then transferred by the station 6 mechanism to station 5, arriving there at the point 112 where it meets a previously formed drag and cope and is assembled with them by the time point 133 is reached. At point 114, the core has been placed in the drag mold and the core header returns back to station 7, arriving there at point 115 to repeat the operation beginning at 110a. The new set of cores, which begins to be shot at the point 110a and is transferred from point 111a at station 7 to point 112a at station 5, meets the drag which was shot at point 100 and the cope which was shot at point 105, whereas the set of cores which arrive at the point 112 meets a cope and drag formed in a previous portion of the cycle, at 100a and 105a. It will be noted that between the points 111, 112 the core box bottom and cores are rolled over and the arm or header is rolled over again in returning from point 114 to point 115.

Figure 19:
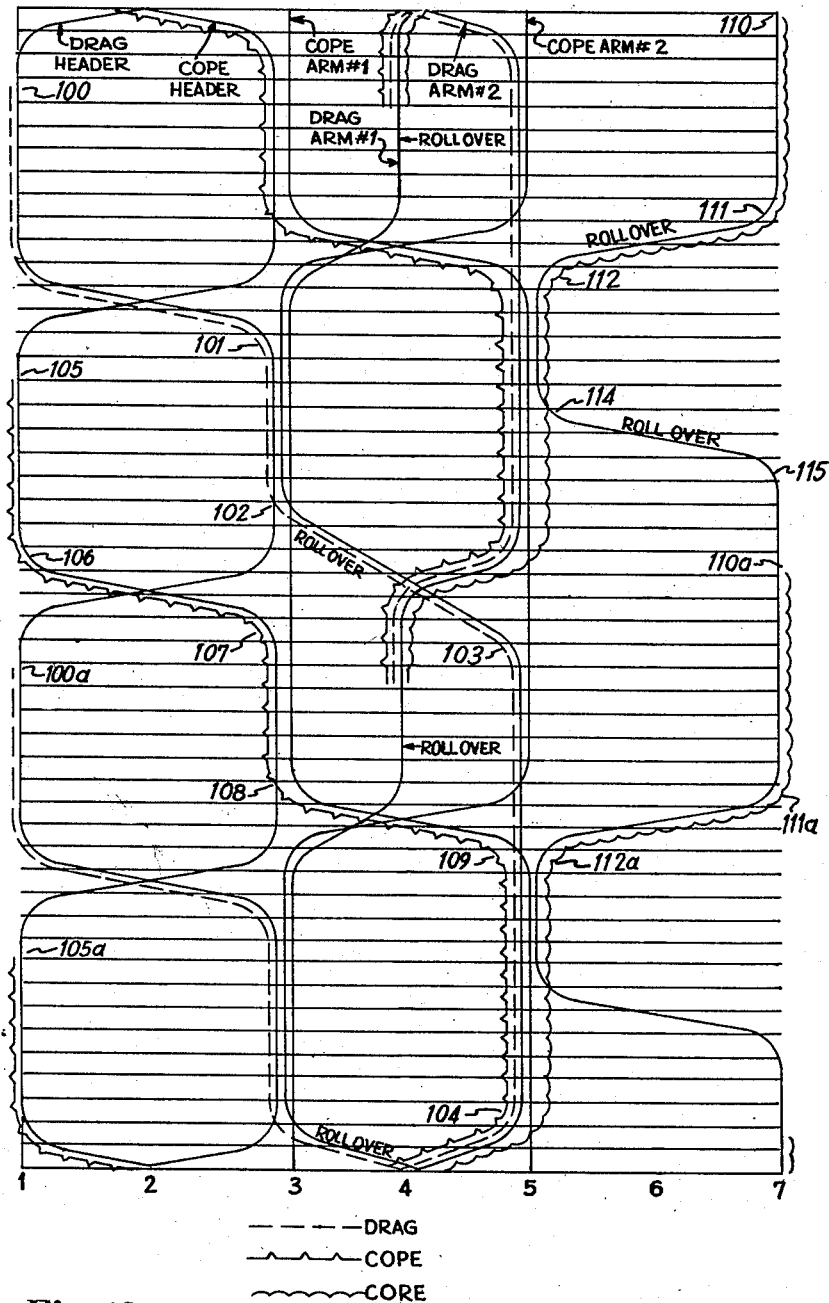
FIGURE 19 is a chart showing the timing of the operations of the various elements of the apparatus, which chart is to be read from the top to bottom with the horizontal lines indicating approximately one second intervals of time. It should be understood that this chart is repetitive, and that the top and bottom horizontal lines should be considered as the same line, or point of time.

A study of the diagram of FIGURE 19 will reveal that a complete cycle involves a complete operation beginning with the shooting of a drag mold all the way to the discharge of a completed mold but that during this complete cycle, half of a succeeding drag mold cycle is being carried on. The same is true of the cope mold forming operation, so that two completed molds with cores assembled are formed during one complete cycle as illustrated in FIGURE 19.

The diaphragm is shown in FIGURE 16 at 56 and it is mounted by means of the structure indicated generally at 57 provided with the wheels 58 to ride on the rails 59. A rod 60 secured to a piston operating in an air cylinder 61 will, upon admission of fluid to the cylinder 61 in known manner, cause the diaphragm 56 to be withdrawn to an aside position or moved into position over the core box top 46. The particular diaphragm assembly shown in FIGURE 17 which we refer to as a plain type diaphragm assembly may comprise a frame closed at the top as at 63 carrying a resilient rubber-like sheet diaphragm or the like 62, so disposed that air may be admitted to the space between the top and the resilient sheet to cause the sheet 62 to thrust downwardly over the entire area of the core box top. This type of diaphragm is useful where the core box top depth is great enough to provide the strength to withstand ejection pressure over the entire area of the core box top. This diaphragm has the advantage that it is independent of core spacing in the event multiple cores are used, so that it need not be changed when a core box with a different spacing of openings is used.

Where the core box top is relatively thin and particularly where a multiplicity of small cores are to be ejected, we prefer to use the diaphragm of FIGURE 18 which we refer to as a button type diaphragm. Here again there is a frame closed at the top at 63a but the sheet 62a rests upon and is secured to a movable plate 64 having perforations spaced in conformity with the cores in the core box top. A button element 65 is secured in each of the holes in the plate 64 so that when pressure is applied in the space between the sheet 62a and the top 63a, the plate 64 and the buttons 65 are urged downwardly, each button pressing against an individual core. In this way the ejection force of the diaphragm is concentrated only on the individual cores. In extreme cases, vacuum may be used under the diaphragm to cause ejection of cores without any net downward force on the core box top, or alternatively in addition to the pressure above the diaphragm to assist in the ejection operation together with pressure exerted by the diaphragm. Alternatively air pressure can be used directly on the cores for ejection. Still another important practical construction and method for core ejection is the use of a plain set of buttons or knockouts which are brought in between the blow plate and the corebox top. The corebox top only, then moves up leaving the cores in the corebox bottom.

We have thus described a complete integrated mold making machine and have described the interrelation of the various parts thereof and their interaction. By means of the timing diagram of FIGURE 19, we have indicated the sequence of operations and their time relationship to each other. In the interest of avoiding undue complexity we have not shown electric circuit diagrams nor have we shown hydraulic pressure lines nor pneumatic pressure or vacuum lines nor $CO_2$ gas lines. The provision of the necessary circuitry including valves, relays and the like will be within the skill of the mechanic to provide based upon understanding of the foregoing description.

It will also be understood that while we have shown radially disposed transfer arms for moving mold parts from one station to another, that these parts may be moved in other ways and by other means within the spirit of the invention. Likewise while we prefer to use air pressure or air pressure and vacuum to extract molds from their mold boxes, other means may be used such as knockout plugs or extraction rods (as is current practice) without departing from the spirit of the invention. Likewise while we prefer to use vacuum for the securing of molds to the respective transfer devices, other means may be used such as latches of various kinds without departing from the spirit of the invention. It will also be understood that we have disclosed a complete apparatus including means for providing cores for molds but that the apparatus may be used without the core shooting station No. 7, so that when the completed cope and drag molds are brought to the assembly station they are simply assembled without the insertion of a core or cores therebetween and discharged for subsequent casting.

It will also be understood that while the foregoing description has been specific to molds and cores produced by blowing or shooting sand, and hardening by treatment with $CO_2$, the apparatus may function with any suitable mold and core making apparatus at stations 1 and 7 respectively. For this reason the terms "shooting station" as applied to the stations where the molds and cores are initially produced are not intended to limit the claims to the use of $CO_2$ hardened sand molds and cores produced by blowing or shooting.

For the various foregoing reasons we do not intend to limit ourselves otherwise than as specifically set forth in the claims.

Having now fully described our invention, what we claim as new and desire to secure by Letters Patent is:

1. An apparatus for preparing a sand mold for pouring, the apparatus having a shooting station, an extraction station and as assembly station, said shooting station comprising a machine for shooting sand into a mold box containing a pattern to produce a sand mold half, means for presenting to said machine alternately a drag mold box and pattern, and a mating cope mold box and pattern, and for moving the filled mold boxes to an extraction station sequentially, means at said extraction station for extracting the said molds alternately from said drag and cope mold boxes, means for alternately moving said completed drag and scope molds from said extracting station to said assembly station, means operative during the movement of said drag mold from the extraction station to the assembly station for inverting said drag mold, all of the foregoing means operating in timed relation to provide at said assembly station a completed drag mold and a completed cope mold in spaced, aligned positions, means to bring said drag mold and said cope mold together, closing and completing said mold, and means to move said completed mold out of said apparatus for pouring.

2. An apparatus according to claim 1, wherein said patterns are configured to provide mating, multiple cavity, drag and cope molds.

3. An apparatus according to claim 1, wherein said sand shooting machine is provided with a table on which a moldbox is supported during shooting, means for raising said table to shooting position and lowering it therefrom, a squeeze plate mounted for sliding movement from an aside position to a position over a mold box on said table, means operative in timed relation to the operation of said shooting machine to move said squeeze plate from said aside position to a position over said mold box, and means operated in timed relation to the movement of said squeeze plate to raise said table and press said filled mold box thereagainst under high pressure to compact the sand and flatten the back of the mold.

4. An apparatus according to claim 3, wherein separate means are provided to force said squeeze plate toward the aside position a small distance just prior to the lowering of said table from shooting position, to break the adhesion of the sand to the squeeze plate, whereby to assure a smooth mold back.

5. An apparatus according to claim 1, wherein the means for presenting mold boxes to said shooting machine and for moving them to said extraction station comprises a standard, two oppositely diametrically arranged and individually mounted arms extending from said standard, each of said arms having means for supporting a mold box thereon for shooting, one arm carrying a drag mold box and the other a cope mold box, and means to cause said standard to rotate 180° intermittently in timed relation to the operation of said shooting machine, whereby alternately to present an empty one of said drag and cope mold boxes to said shooting machine to be shot with sand, and a filled one of said drag and cope mold boxes to the extraction station for extraction of the mold from the box, said arm being individually arranged to be free for up and down movement at both said stations.

6. An apparatus according to claim 1, wherein there is a column disposed between said extraction station and said assembly station, a pair of oppositely, diametrically arranged arms extending from said column, each of said arms having means at its outer end for carrying a cope mold, means for intermittently swinging said arms through an arc of 180° in timed relation to the operation of the extraction portion of the apparatus to convey extracted cope molds from said extraction station to said assembly station, two individual drag arms mounted for independent swinging movement about said column, each of said drag arms having means at its outer end for carrying a drag mold, means for moving each of said drag arms from a position at said extraction station to a position at said assembly station and concurrently to invert said drag mold carrying means, and thereafter, after assembly of a cope mold to a drag mold, to move each of said drag arms without inversion of the drag mold carrying means to a discharge station for discharge of a completed mold, and thereafter to return each of said drag arms while again inverting them, to said extraction station.

7. An apparatus according to claim 6, wherein means are provided to exhaust air through said cope mold carrying means and their respective arms, and through said drag mold carrying means and their respective arms to cause said drag and cope molds to be held on their respective carrying means for transfer from said extraction station to said assembly station without any shift in position on the carrying means.

8. An apparatus according to claim 1, wherein said extraction station comprises a table having means for raising and lowering it in timed relation to the arrival of filled mold boxes brought to it, means to cause said table to rise carrying with it, alternately, a filled drag mold box and a filled cope mold box into contact with said means for moving the extracted molds from said extraction station to said assembly station, means for extracting said mold from its mold box and retaining it on said means for moving the extracted molds, and means to cause said table to drop, carrying with it the empty mold box.

9. An apparatus according to claim 8, wherein said means for extracting sand molds from said drag and cope mold boxes comprise means to supply air under pressure through said table and the mold box resting thereon to a mold in said mold box, and means operative concurrently with said last named means for exhausting air through said means for moving the extracted molds from said extraction station to said assembly station, the combined action of said air under pressure and said exhausted air serving to extract said mold from said box, and said exhausted air serving to support said extracted mold on said moving means for transfer to said assembly station.

10. An apparatus according to claim 1, wherein said assembly station comprises means to raise the drag mold off the drag mold carrying means into contact with a cope mold held in aligned position by said cope mold carrying means, to close and complete the mold, means to lower the completed mold to said drag mold carrying means for subsequent movement to a discharge station, said various means operating in timed relation to the operation of the means supplying completed drag and cope molds to said assembly station.

11. An apparatus according to claim 1, having additionally a core shooting station comprising a machine for shooting sand into a core box having a top and bottom and containing a core cavity, means for ejecting a completed core from the core box top, means for moving the core box bottom and the core contained therein to said assembly station, means operative during the movement of said core box bottom from the core shooting station to said assembly station for inverting said core box bottom, all of the foregoing means operating in timed relation to provide at said assembly station a core box bottom and the contained core between said aligned and spaced drag and cope molds, means to bring said drag mold and core box bottom together to seat said core in said drag mold, means to extract said core from said core box bottom, means to move said core box bottom back to said core shooting station, whereby when said core containing drag mold and cope mold are brought together the mold is closed and completed.

12. An apparatus according to claim 11, wherein the means for ejecting a core from said core box top comprises a diaphragm device insertable between the blow-plate of said core shooting machine and the core box top, said diaphragm device comprising a box-like structure having a flexible rubber-like sheet on one face and means for forcing air under pressure into said box-like structure to cause said sheet to tend to bulge down against the top of the core in said core box top, said core-shooting station having means to retain said core box top in position, and a table for supporting the core box bottom, and means to cause said table to drop concurrently with the operation of said diaphragm to cause the core to remain in said core box bottom and drop therewith when said table drops, whereby said core is ejected from said core box top.

13. An apparatus according to claim 12, wherein said core box is provided with multiple cavities so as to produce multiple cores, and wherein said diaphragm operates concurrently to eject all of said cores from said core box top.

14. An apparatus according to claim 11, wherein the means for ejecting a core from said core box top comprises a diaphragm device insertable between the box-plate of said core shooting machine and the core box top, said diaphragm device comprising a box-like structure having a flexible rubber-like sheet on one face, and means for forcing air under pressure into said box-like structure, a plate abutting said rubber-like sheet, said plate having a plurality of button-like projections, whereby when air is forced into said box-like structure said buttons press against said core, said core shooting station having means to retain said core box top in position, and a table for supporting the core box bottom, and means to cause said table to drop concurrently with the operation of said diaphragm to cause the core to remain in said core box bottom and drop therewith when said table drops whereby said core is ejected from said core box top.

15. An apparatus according to claim 14, wherein said core box is provided with multiple cavities so as to produce multiple cores, and wherein the buttons of said diaphragm device are arranged such that each of said multiple cores is abutted by one of said buttons, and wherein upon actuation of said diaphragm device all of said cores are ejected concurrently from said core-box top.

16. An apparatus according to claim 1 wherein said means for extracting the said molds from said mold boxes comprises means for bringing said filled mold boxes into contact with said means for moving said molds from said extracting station to said assembly station, and means for continuously exhausting air through said means for moving said molds, the vacuum action of said continuously exhausted air serving to retain said mold against said means for moving said molds.

17. An apparatus for preparing a sand mold for pouring, the apparatus having a shooting station, an extraction station and assembly station, said shooting station comprising a machine for shooting sand into a mold box containing a pattern, to provide a sand mold half, said shooting machine having a table on which a mold box is supported during shooting, means for raising said table to shooting position and lowering it therefrom, a squeeze plate mounted for sliding movement from an aside position to a position over a mold box on said table, means operative in timed relation to the operation of said shooting machine to move said squeeze plate from said aside position to a position over said mold box, and means operating in timed relation to the movement of said squeeze plate to raise said table and press said filled mold box thereagainst under high pressure to compact the sand and flatten the back of the mold, and separate means to force said squeeze plate toward the aside position a small distance just prior to the lowering of said table from shooting position, to break the adhesion of the sand to the squeeze plate, whereby to assure a smooth mold back; means for presenting to said machine alternately a drag mold box and pattern, and a mating cope mold box and pattern, and for moving the filled mold boxes to said extraction station sequentially, said last mentioned means comprising a standard, two oppositely, diametrically arranged and individually mounted arms extending from said standard, each of said arms having means for supporting a mold box thereon for shooting, one arm carrying a drag mold box and the other a cope mold box, and means to cause said standard to rotate 180° intermittently in timed relation to the operation of said shooting machine, whereby alternately to present an empty one of said drag and cope mold boxes to said shooting machine to be shot with sand, and a filled one of said drag and cope mold boxes to the extraction station for extraction of the mold from the box, said arms being individually arranged to be free for up and down movement at both said stations, means for alternately moving completed drag and cope molds from said extraction station comprising a table having means for raising and lowering it in timed relation to the arrival of filled mold boxes brought to it by said mold box supporting arms, means to cause said table to rise, carrying with it said mold box supporting arm, to bring, alternately, a filled drag mold box and a filled cope mold box into contact with said means for moving the extracted molds from said extraction station to said assembly station, means for freeing said mold from its mold box and retaining it on said means for moving the extracted molds, and means to cause said table to drop, carrying with it the empty mold box and said supporting arm; said means for moving the extracted molds comprising a column disposed between said extraction station and said assembly station, a pair of oppositely, diametrically arranged arms extending from said standard, each of said arms having means at its outer end for carrying a cope mold, means for intermittently swinging said arms through an arc of 180° in timed relation to the operation of an extraction station to said assembly station, two individual drag arms mounted for independent swinging movement about said column, each of said drag arms having means at its outer end for carrying the drag mold, means for moving each of said drag arms from a position at said extraction station to a position at said assembly station, and concurrently to invert said drag mold carrying means, and thereafter, after assembly of a cope mold to a drag mold, to move each of said drag arms without inversion to a discharge station for discharge of a completed mold, and thereafter to return each of said drag arms, while again inverting them, to said extraction station; said assembly station comprising means to raise a drag mold off the drag mold carrying means into contact with a cope mold now held in aligned position by said cope mold carrying means, to close and complete a mold, means to lower the completed mold to said drag mold carrying means for subsequent movement to the discharge station, all of said means at said assembly station operating in timed relation to the operation of the means supplying completed drag and cope molds to said assembly station.

18. An apparatus according to claim 17, wherein the means for moving the extracted drag and cope molds from said extraction station to said assembly station are provided with means of pulling a vacuum therethrough, for extraction of said molds from said boxes, and to hold said molds after extraction and during transfer.

19. An apparatus according to claim 18, wherein the means for moving the filled mold boxes to the extraction station are provided with means for applying air pressure to the undersides of molds in said boxes to assist in the extraction of said molds from said boxes.

20. An apparatus according to claim 17, wherein means are provided on the drag and cope mold moving means to hold said drag and cope molds thereto, for extraction and transfer, and wherein the means for moving the filled mold boxes to the extraction station are provided with means for applying air pressure to the undersides of molds in said boxes to assist in the extraction of said molds from said boxes.

21. An apparatus for preparing a multiple cavity sand mold with multiple sand cores for pouring, said apparatus having a mold shooting station, an extraction station, an assembly station, and a core shooting station, said mold shooting station comprising a machine for shooting sand into a mold box containing a pattern to produce a multiple cavity sand mold half, means for presenting to said machine alternately a drag mold box and pattern, and a mating cope mold box and pattern, means for moving the filled mold boxes to an extraction station, means at said extraction station for extracting the sand molds alternately from said drag and cope mold boxes, means for alternately moving said completed drag and cope molds from said extraction station to an assembly station, means operative during the movement of said drag mold from the extraction station to the assembly station for inverting said drag mold, a machine for shooting sand into a core box corresponding in size to said drag and cope mold boxes, and containing core cavities producing a number of cores laid out in an arrangement corresponding to the cavities in said mold, means for ejecting said completed cores from the core box top, means for moving said core box bottom and the cores contained therein to said assembly station, means operative during the movement of said core box bottom from the core shooting station to the assembly station for inverting said core box bottom, all of the foregoing means operating in timed relation to provide at said assembly station a completed drag mold and a completed cope mold in spaced, alinged mutually facing positions with the core box bottom and the contained cores between said drag and cope molds, means to bring said drag mold and core box bottom together to seat said cores in the cavities in said drag mold, means to eject said cores from said core box bottom, means to move said core box bottom back to said core shooting station, means to bring said core-containing drag mold and said cope mold together, closing and completing the mold, and means to move said completed mold out of said apparatus for pouring.

22. An apparatus according to claim 21, wherein said means for extracting sand molds from said drag and cope mold boxes comprise means to supply air under pressure through a mold box to a mold contained in said mold box, and means operative concurrently with said last named means for exhausting air through said means for moving the completed molds from said extraction station to said assembly station, the combined action of said air and pressure and said exhausting of air serving to extract said mold from said box, and said exhausting of air serving to support said extracted mold on said moving means for transfer to said assembly station.

23. An apparatus according to claim 21, wherein the core-box bottom moving means is provided with means for exhausting air therethrough to support the contained cores thereon during transfer and inversion.

24. An apparatus according to claim 21, wherein the means for ejecting a core from said core box top comprises a diaphragm device insertable between the blowhead of said core shooting machine and the core box top, said diaphragm device comprising a box-like structure having a flexible rubber-like sheet on one face, and means for forcing air under pressure into said box-like structure to cause said sheet to tend to bulge down against the tops of the cores in said core box top, said core shooting station having means to retain said core box top in position, and a table for supporting the core box bottom, and means to cause said table to drop concurrently with the operation of said diaphragm to cause the cores to remain in said core box bottom and drop therewith when said table drops, whereby said cores are ejected from said core box top.

25. An apparatus according to claim 24, wherein the said rubber-like sheet abuts a plate having a plurality of button-like projections arranged such that each of said multiple cores is abutted by one of said buttons, and wherein upon actuation of said diaphragm device all of said cores are concurrently ejected from said core-box top.

References Cited by the Examiner
UNITED STATES PATENTS

| | | | |
|---|---|---|---|
| 1,512,721 | 10/24 | Sutton. | |
| 1,768,359 | 6/30 | Hazell | 22—31 |
| 2,068,835 | 1/37 | Wurster | 22—20 |
| 2,325,501 | 7/43 | Gedris | 22—20 |
| 2,435,507 | 2/48 | Pattison | 22—34 |
| 2,624,084 | 1/53 | Row | 22—31 XR |
| 2,871,527 | 2/59 | Wallwork | 22—31 XR |
| 2,904,858 | 9/59 | Pinchon | 22—34 |
| 3,075,262 | 1/63 | Bilter | 22—36 |

MARCUS U. LYONS, *Primary Examiner.*

MICHAEL V. BRINDISI, WILLIAM J. STEPHENSON, *Examiners.*